United States Patent
Whiteside

[11] Patent Number: 6,070,629
[45] Date of Patent: Jun. 6, 2000

[54] PROTECTIVE VEHICLE COVER

[76] Inventor: Larry L. Whiteside, 2100 Grayson Dr., Apt. 625, Grapevine, Tex. 76051

[21] Appl. No.: 08/870,819

[22] Filed: Jun. 6, 1997

[51] Int. Cl.[7] .............................. B60J 11/00; B65D 65/02
[52] U.S. Cl. ............................................. 150/166; 296/136
[58] Field of Search .................................. 150/166–168; 296/136

[56] References Cited

U.S. PATENT DOCUMENTS

| | | | |
|---|---|---|---|
| 3,142,599 | 7/1964 | Chavannes | 206/522 X |
| 3,665,355 | 5/1972 | Sasaki et al. | 296/136 X |
| 4,049,036 | 9/1977 | Gebhardt | 150/168 |
| 4,294,483 | 10/1981 | Ferris | 296/136 |
| 4,628,549 | 12/1986 | Lazar | 4/498 |
| 4,698,109 | 10/1987 | Lazar | 156/145 |
| 4,807,922 | 2/1989 | Glover | 296/136 |
| 4,938,522 | 7/1990 | Herron et al. | 150/166 X |
| 5,287,904 | 2/1994 | Smith et al. | 150/166 |
| 5,324,090 | 6/1994 | Lehnhoff | 150/166 X |
| 5,350,000 | 9/1994 | Wang | 150/166 |
| 5,356,191 | 10/1994 | Sheehan | 150/166 X |
| 5,401,074 | 3/1995 | Timerman | 296/136 |
| 5,441,095 | 8/1995 | Trethewey | 160/370.21 |
| 5,490,707 | 2/1996 | De La Cruz | 150/166 X |
| 5,518,289 | 5/1996 | Cobble | 150/166 X |
| 5,519,965 | 5/1996 | Robinson | 47/31 |
| 5,597,005 | 1/1997 | Thomas | 135/87 |
| 5,664,825 | 9/1997 | Henke et al. | 150/166 X |

FOREIGN PATENT DOCUMENTS

| | | | |
|---|---|---|---|
| 3928695 | 3/1991 | Germany | 296/136 |
| 4400392 | 6/1994 | Germany | 296/136 |

*Primary Examiner*—Sue A. Weaver
*Attorney, Agent, or Firm*—Felsman, Bradley, Vaden, Gunter & Dillon; Charles D. Gunter, Jr.

[57] ABSTRACT

A protective vehicle cover is shown for protecting an outer surface of a vehicle from hail and other falling objects. The cover includes a flexible blanket having an inner ply, an outer ply and bubble-like air pockets which are sandwiched between the inner and outer plies. A fastener is provided for attaching the flexible blanket to the outer surface of the vehicle. Preferably, the air pockets are bubble-like spherical or hemispherical embossments formed on an inner ply of the blanket material, the pockets being generally circular in cross-section with an average maximum diameter of about 1.5 inches or less. An inner thin film plastic backing layer can be laminated to an intermediate film layer which has been embossed to form the air pockets therebetween with an outer cover layer being laminated to the emboss layer to provide an outer, decorative appearance for the vehicle cover.

6 Claims, 2 Drawing Sheets

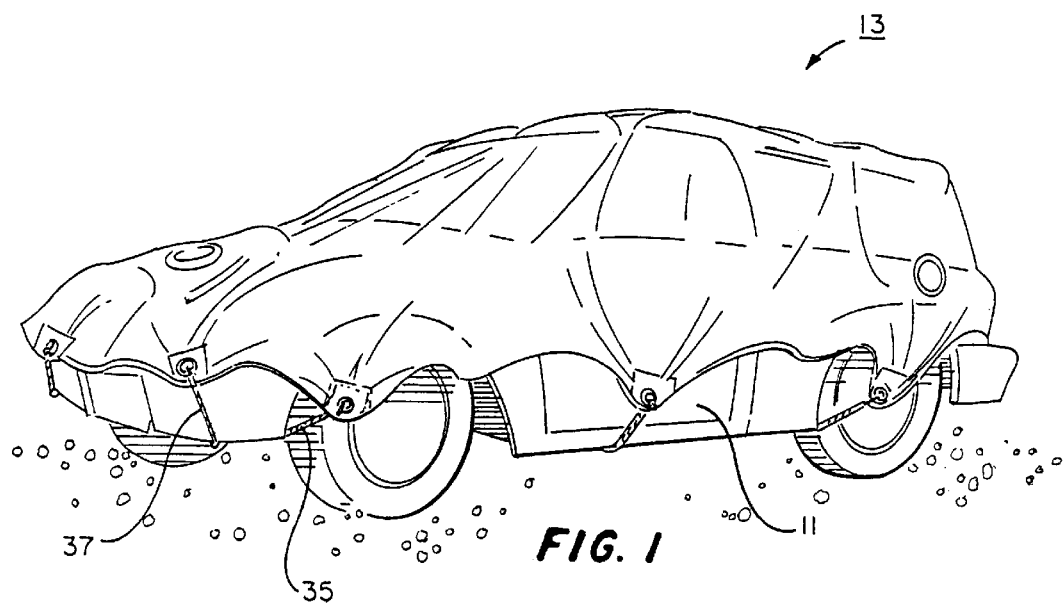
FIG. 1
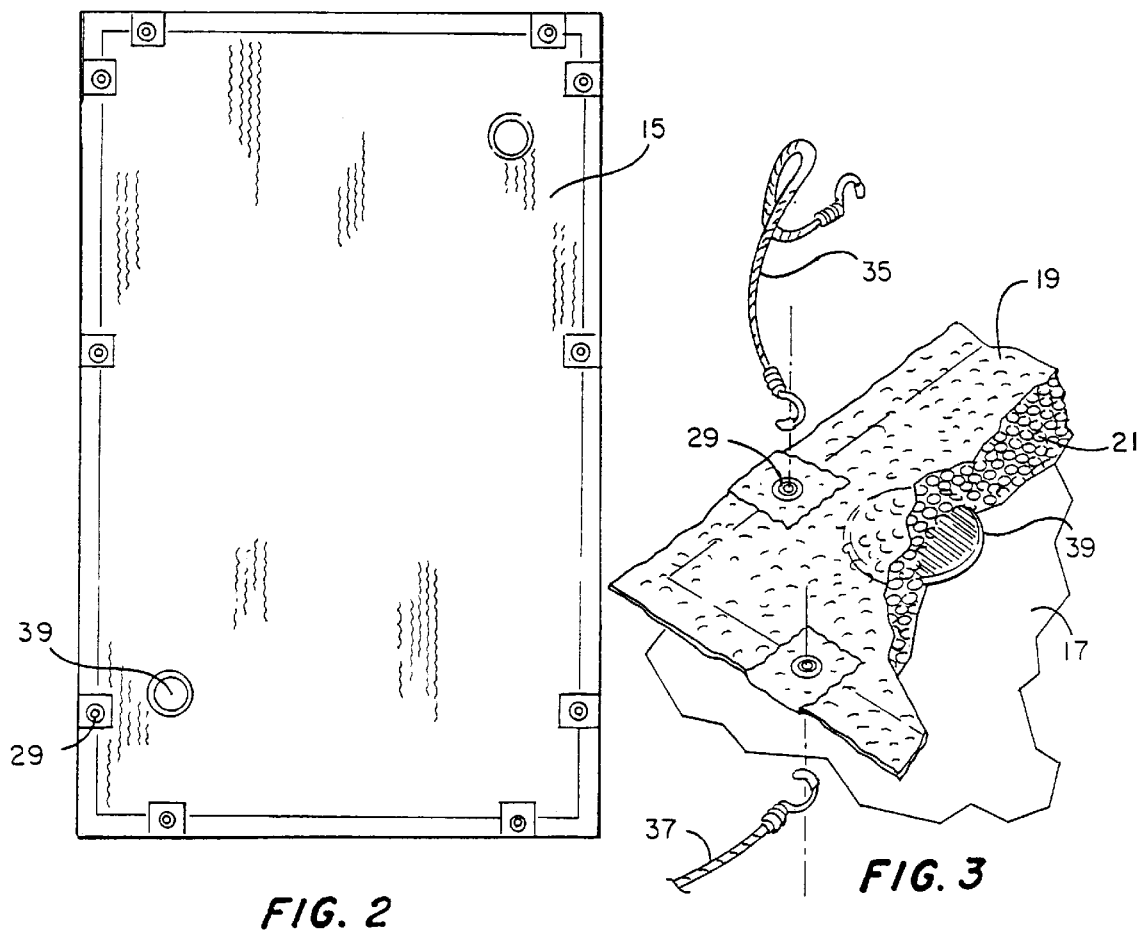
FIG. 2
FIG. 3

PROTECTIVE VEHICLE COVER

BACKGROUND OF THE INVENTION

1. Field of the Invention

The present invention relates generally to vehicle covers which can be temporarily installed on an outer surface of the vehicle for protecting the vehicle from hail and other falling objects.

2. Description of the Prior Art

Hail is a form of precipitation which falls in the form of small balls or lumps of ice and compact snow. Although hail is generally relatively small in diameter, it has been reported to be softball size and larger. At least about half of the continental United States, from the rocky mountains to the east coast is affected by hail each year. Roughly a seven state area in the midwest and southwestern United States is particularly susceptible to hail damage. Several areas in Texas have experienced hail damage in the millions of dollars in recent years. Home owner damage including replacement of roofs, and damage to uncovered vehicles has caused insurance rates to skyrocket. In addition to individual automobiles which have been damaged, automobile dealerships typically have no way to protect new car inventory and usually resort to selling damaged vehicles at a discounted price.

Protective car covers of a variety of types are known in the prior art. Most of these covers were intended to protect the vehicle from typical outdoor weather conditions including sun, rain, snow, ice or the like but were not specifically intended to protect from falling objects such as hail. While these prior art covers may have provided some degree of minimal protection, they were not sufficient to protect from large diameter hail or were deficient in some other major regard.

U.S. Pat. Nos. 5,597,005 and 5,519,965 both show protective canopies which could provide drive under protection for vehicles in the event of a hail storm. However, the assemblies are complicated to erect and maintain and would be relatively expensive to produce.

U.S. Pat. No. 5,441,095 shows a detachably mounted windshield screen which could protect against damage caused by hail or wind driven sand but is mainly intended to shield against solar and ultraviolet radiation, thereby preventing heat buildup within the vehicle.

U.S. Pat. No. 5,401,074 shows a hail protective vehicle cover which can be stored in the trunk of the vehicle and deployed when needed. Attaching straps and runners are utilized to hold a cloth tarp in a spaced apart relation to the top surface of the vehicle in use. Damage to the vehicle is prevented by means of the taut cloth repelling falling objects as long as it remains in a spaced apart relationship from the vehicle. Thus, the protective cover forms a type of taut trampoline over, but spaced apart from the vehicle.

The present invention has as its object to provide a protective vehicle cover that effectively protects a vehicle from hail and other falling objects and which is easily installed, removed and is compact enough to be stored in the trunk of the vehicle.

Another object of the invention is to provide a protective vehicle cover which is lightweight, compact and has good storage capabilities.

Another object of the invention is to provide a protective vehicle cover comprised of multiple plies of material with trapped air in the form of bubbles forming a cushion to protect against hail, freezing rain and other types of falling objects.

Another object of the invention is to provide a protective vehicle cover which is simple to deploy and which includes a temporary positioning means to assist a user in installing the cover, even in windy conditions.

SUMMARY OF THE INVENTION

The protective vehicle cover of the invention is used to protect an outer surface of a vehicle from hail and other falling objects. The cover comprises a flexible blanket having an inner ply, an outer ply and a plurality of bubble-like air pockets therebetween. At least one fastener is provided for attaching the flexible blanket to the outer surface of the vehicle. Positioning means can also be provided for temporarily holding the blanket in place on the outer surface of the vehicle while the fastener is being attached.

Preferably, the flexible blanket is comprised of an inner thin film plastic backing layer, an intermediate film layer which has been laminated to the backing layer and embossed to form air pockets therebetween and an outer cover layer. The embossments which form the air pockets are generally either hemispherical or partly hemispherical in profile and comprise at least about 40% of the area of the intermediate film layer which is laminated to the backing layer. Preferably, the air pockets are bubble-like protrusions having a generally circular cross-section with the average maximum diameter of the circular cross-section of the pockets being about 1.5 inches or less. Most preferably, the average maximum diameter of the circular cross-section of the pockets is about 0.75 inches or less and the air pockets comprise at least about 60% of the area of the intermediate film layer which is laminated to the backing layer. The inner backing layer and intermediate embossed layers are preferably formed of a thin film polyolefin material and the cover layer is formed from a material selected from the group consisting of nylon, vinyl plastics and polyolefins. The outer layer can be selected to be a woven vinyl plastic laminated layer which provides a decorative outer appearance for the blanket when the blanket is attached to the outer surface of the vehicle.

Additional objects, features and advantages will be apparent in the written description which follows.

BRIEF DESCRIPTION OF THE DRAWINGS

FIG. 1 is a front, perspective view of a preferred embodiment of the protective cover of the invention attached to and covering a vehicle;

FIG. 2 is a plan view of the protective cover of the invention showing the reinforced grommet areas and magnetic positioning means of the invention;

FIG. 3 is a close-up view, partly broken away of a portion of the protective cover of the invention showing the reinforced grommets used to receive fastening cords and showing a portion of a permanent magnet affixed to the cover;

DETAILED DESCRIPTION OF THE INVENTION

FIG. 1 shows a vehicle 11 which is covered with the protective vehicle cover of the invention, designated generally as 13. As shown in FIG. 1, the protective vehicle cover 13 can be used to protect an outer surface, such as the hood, roof and trunk of the vehicle from hail and other falling objects. While the cover illustrated in FIG. 1 also covers portions of the sides of the vehicle, it will also be understood that the cover could be configured differently to cover only the top surface areas of the vehicle, if desired.

Figure 4:
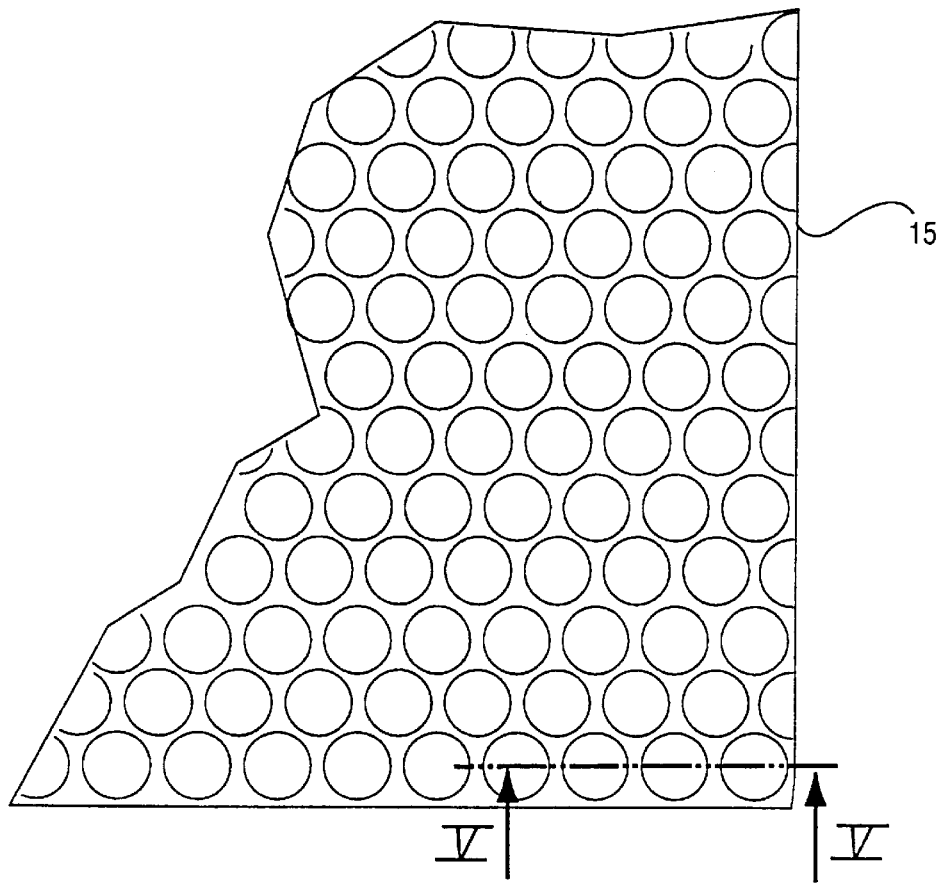
FIG. 4 is a partial, top view of the flexible blanket used to form the vehicle cover of the invention with the embossments which are used to form the air pockets being shown in dotted lines.
Figure 5:
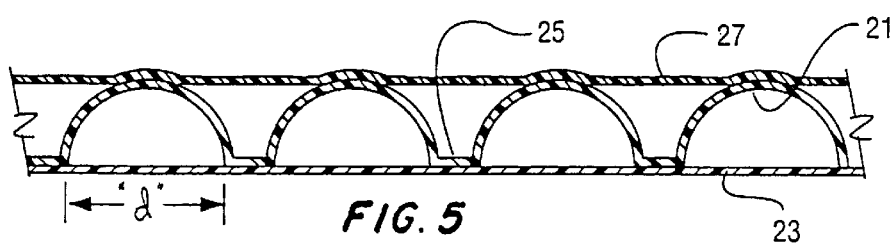
FIG. 5 is a cross-sectional view taken along lines V—V in FIG. 4 showing the inner thin film plastic backing layer, the embossed intermediate film layer and the laminated cover layer.

The protective vehicle cover comprises a flexible blanket (15 in FIG. 2) which can be rolled up and stored in the vehicle trunk when not in use and which can be quickly and easily deployed in the event of inclement weather. The flexible blanket 15, as shown in FIGS. 3–6, includes an inner ply 17, an outer ply 19 and a plurality of bubble-like air pockets therebetween. As best seen in FIG. 5, the respective plies of the blanket are preferably formed as an inner thin film plastic backing layer 23, an intermediate film layer 25 which has been laminated to the backing layer and embossed to form air pockets 21 therebetween and a cover layer 27 which is laminated to the intermediate layer opposite the backing layer. The bubble-like air pockets 21, as shown in FIG. 5, are generally circular in cross-section but can assume other shapes such as rectangles, triangles, and the like. In the embodiment of the invention illustrated in FIG. 5, the maximum average diameter ("d" in FIG. 5) is about 1.5 inches or less, preferably about 0.75 inches or less. The embossments which form the air pockets 21 preferably comprise at least about 40% of the area of the intermediate film layer 25 which is laminated to the backing layer 23. Most preferably, the embossments which form the air pockets comprise at least about 60% of the area of the intermediate film layer 25. Any convenient materials can be utilized to form the respective plies of the blanket but thin film plastics, such as commercially available polyolefin materials are preferred for the backing layer 23 and intermediate layer 25. The cover layer 27 is preferably a material selected from the group consisting of nylon, vinyl plastics and polyolefins. The inner backing layer has a thickness in the range from about 2 to 10 mils and the intermediate embossed layer has a thickness in the range from about 5 to 20 mils. The cover layer 27 is preferably a woven vinyl plastic which forms a decorative outer appearance for the blanket when the blanket is attached to the outer surface of the vehicle.

The inner plies 23, 25 of the blanket 15 are commercially available materials which have been used in the past for packaging materials and for such diverse purposes as swimming pool covers. The general family of materials is represented by such materials as "POLYCAP" from Sealed Air Corporation of Saddlebrook, N.J. This material is a "barrier bubble" cushioning material which employs a thin, co-extruded nylon barrier and utilizes inner bubbles that retain air to provide a cushioning effect for packaging materials and similar applications. Another material of the same general family is the "AQUACOVER" material available from Cantar Corporation of Ontario, Canada.

These "bubble barrier" type materials and the manufacture thereof are also described in issued U.S. Pat. No. 4,628,549, issued Dec. 16, 1986, to Laser. The general technique is also disclosed in prior U.S. Pat. Nos. 3,026,231; 3,142,559; 3,208,893; 3,294,387; 3,416,984 and others. A thin film plastic backing layer and a layer to be embossed are heated and fed together through a nip formed between an embossing roll and a backing roll. The embossing roll has a plurality of cavities in its surface, which cavities are connected to a vacuum source so that when the embossed film is contacted by the embossing roll (the film being in a preheated condition), the film is sucked into the cavities and embossed. At the same time, the backing film is pressed against the embossed film and laminated thereto. The backing roll is normally covered with an elastomer, e.g., silicone rubber, since it is pressed against the embossing roll at considerable pressures, e.g., 20 to 60 pounds per linear inch or more. The laminated embossed film and backing film form the plies designated as 23 and 25 in FIG. 5 of the present invention.

As has been discussed, the actual embossments which form the air pockets 21 can be of a variety of sizes and shapes and the particular size and shape is not critical. Generally speaking, however, the embossments will be essentially hemispherical or partly hemispherical in shape and will have diameters as little as ⅛ an inch to as much as 1.5 inches or more, but usually the diameters will be from about ¼ inch to ¾ inch. Nevertheless, instead of hemispherical shapes, the embossments can be cylindrical, rectangular, triangular, or other desired shape.

In order to emboss the embossed film and to laminate the backing film thereto, the films must be heated prior to passing through the nip and between the embossing roll and the backing roll. The temperature employed will depend upon the material selected but, as an example, the embossing temperature of ordinary polyethylene film is about 220° F. In order to ensure good lamination, it is usual practice to heat at least one of the films, and preferably both of the films to a temperature above the embossing temperature. The temperature selected will generally be near the fusion temperature of the films which, in the case of ordinary polyethylene is approximately 270° F. Thus, the heating of the films is such that the embossed film is at least above its embossing temperature but at or below its fusion temperature and likewise, the backing film is at a temperature such that the combination of temperatures of the embossed film and backing film are sufficient to permanently laminate the embossed film and backing film. This general discussion is intended to describe the conventional process for producing the "barrier bubble" type material utilized in forming the flexible blanket of the invention. That conventional process, as noted above, is well known in the art and need not be further discussed for the sake of conciseness. As shown in FIG. 5, the traditional bubble barrier material has further laminated thereto a cover layer 27 which is typically of a different material than the inner ply 23 and intermediate ply 25. This material can be selected for its decorative and wear properties and can range from such materials as nylons, vinyl plastics, and the like.

The materials used to form the inner and intermediate plies are normally thermoplastic materials and may vary widely but are usually either polyvinyl chloride, polyvinylidene chloride or a commercially available polyolefin polymer or nylon. It is preferred to use an olefin polymer with polyethylene and polypropylene olefin polymers being most preferred.

It will be appreciated that the flexible blanket plies could be adhered by other than heat laminating processes. For example, the embossed film and backing film could be laminated by adhesive lamination rather than heat lamination.

The material selected for the cover layer 27 can be either a natural or synthetic fiber weave, but synthetic fibers are preferred. When thermoplastic fibers are selected which have similar thermoplastic properties to that of the films making up the backing and intermediate plies, lamination of the fibrous material is facilitated. For example, when the thermoplastic fibers making up the outer cover layer 27 are of olefin polymers, such as polyethylene or polypropylene, and the backing and intermediate films are made of similar olefin polymers, the laminating temperatures of the fibrous material will be close to the laminating temperatures of the films. However, it will be appreciated that while the polymer of the fibrous material may be similar to the polymer of the films, it may not have the same embossing or fusing temperatures as that of the film. Where the fibrous material takes the form of a batt, scrim or fabric form of essentially the same width as that of the blanket, the cover may actually take the form of a coating or lamination of the fibrous material onto the embossed layer. In this embodiment, the fibrous material is substantially co-extensive with the embossed layer, thereby acting to reinforce the entire sheet material.

Figure 6:
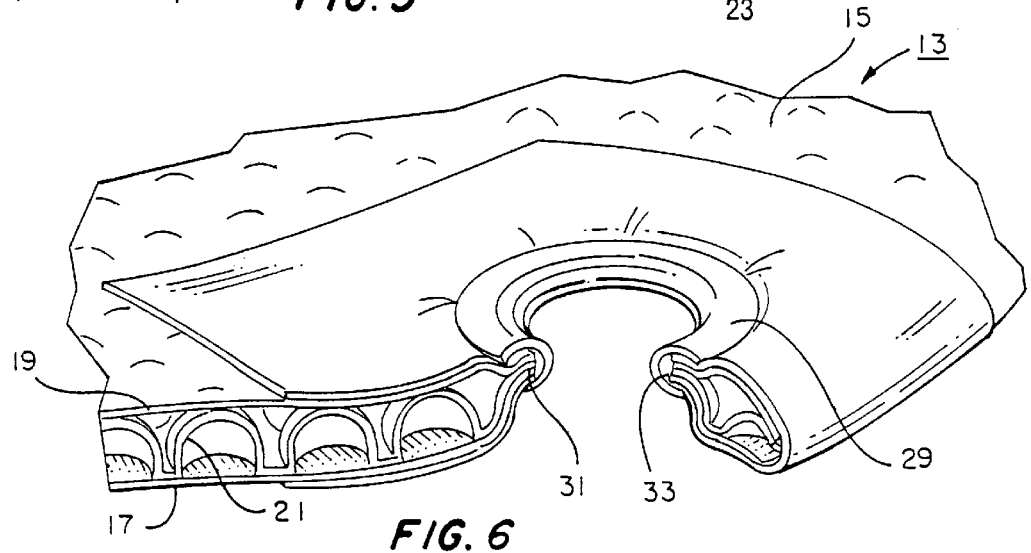
FIG. 6 is a close-up perspective view of a portion of the blanket of the invention showing the reinforced grommet area thereof.

As shown in FIG. 6, the protective vehicle cover 13 has a plurality of reinforced grommet regions including grommets 29 which allow the attachment of fasteners for attaching the flexible blanket to the outer surface of the vehicle 11. The grommet 29 is a generally circular plastic member having an outer lip 31 which receives the edges 33 of the opening provided in the flexible blanket 15. The grommets 29 are designed to receive any convenient fastener for attaching the blanket to the vehicle. Preferably, a plurality of attachment straps, such as bungee cords 35, 37 (FIG. 3). In the embodiment illustrated in FIG. 1, approximately 10 attaching straps are utilized with two straps on the front and rear of the cover and three straps on either side of the cover. The straps on the sides attach to the wheel wells and undercarriage of the vehicle while the front and rear straps attach to the front and rear bumpers or other suitable attachment points.

As shown in FIG. 3, the protective cover also includes a positioning means, such as the permanent magnet 39 which is affixed to the flexible blanket 15 to temporarily hold the blanket in place on the outer surface of the vehicle. The permanent magnet 39 is supplied in the form of a thin disk which is inserted between the cover layer 27 and either the intermediate film layer 25 or backing layer 23 of the flexible blanket.

In use, when a hail storm approaches, the cover 13 is removed from its container and placed on the right front hood area of the vehicle where the magnet disk 39 can adhere. A bungee fastening cord 37 is attached and the cover is then rolled to the back of the vehicle. A second bungee is attached and the cover is opened over the second half of the car. A second magnet disk (not shown) identical to disk 39 adheres to the trunk of the vehicle and a third bungee cord is attached. Then, a fourth bungee is attached to the left front of the auto and the remaining bungees are then attached to complete the installation.

An invention has been provided with several advantages. The protective vehicle cover of the invention utilizes bubble-like air pockets trapped between inner and outer plies of a flexible blanket to protect the outer surface of a vehicle from hail and other falling objects. Because of the flexible and resilient nature of the blanket, it can be easily rolled or folded and stored in the vehicle trunk or other convenient location until needed. The vehicle cover of the invention is simple in design and economical to manufacture, utilizing commercially available materials. The reinforced grommet areas and fastening means provide a convenient method for securely attaching the cover to the vehicle which is to be protected. The use of integral magnetic regions allow the blanket to be easily unrolled or unfolded and installed by a user, even in windy conditions.

While the invention has been shown in only one of its forms, it is not thus limited but is susceptible to various changes and modifications without departing from the spirit thereof.

What is claimed is:

1. A protective vehicle cover for protecting an exposed outer surface of the vehicle having a hood, roof and trunk from hail and other falling objects, the cover comprising:

a flexible blanket having two sides, a front and a back, the blanket also having an inner ply, an outer ply and a plurality of bubble-like air pockets laminated to the inner and outer plys therebetween, the bubble-like air pockets containing trapped air to provide a cushioning effect to protect the outer surface of the vehicle from hail and other falling objects, the blanket being selectively sized to cover the exposed hood, roof and trunk surfaces of the vehicle;

the inner ply being positionable against the outer surface of the vehicle and substantially conforming to the shape of the vehicle, the outer ply being exposed to the weather;

at least one fastener for attaching the flexible blanket to the outer surface of the vehicle; and wherein the bubble-like air pockets are generally circular in cross section and wherein the average maximum diameter of the circular cross section of the pockets is less than about 0.75 inches, and wherein the air pockets comprise at least 40% of the area of the inner ply.

2. The protective vehicle cover of claim 1, wherein the flexible blanket is comprised of an inner thin film plastic backing layer, an intermediate film layer which has been laminated to the backing layer and embossed to form air pockets therebetween and an outer cover layer.

3. The protective vehicle cover of claim 2, wherein the outer cover layer of the flexible blanket is formed from a material selected from the group consisting of nylon, vinyl plastics and polyolefins.

4. A protective vehicle cover for protecting an exposed outer surface of the vehicle having a hood, roof and trunk from hail and other falling objects, the cover comprising:

a flexible blanket having two sides, and a front side and a back side, the blanket also having an inner thin film plastic backing layer, an intermediate film layer which has been laminated to the backing layer and embossed to form bubble-like air pocket embossments therebetween and a cover layer laminated to the intermediate layer opposite the backing layer, the blanket being selectively sized to cover the exposed hood, roof and trunk surfaces of the vehicle;

wherein the embossments which form the air pockets are generally hemispherical in profile and wherein the embossments comprise at least 60% of the area of the intermediate film layer which is laminated to the backing layer;

the inner ply being positionable against the outer surface of the vehicle and substantially conforming to the shape of the vehicle, the outer ply being exposed to the weather;

wherein the inner backing layer has a thickness in the range from about 2 to 10 millimeters and the intermediate embossed layer has a thickness in the range from about 5 to 20 millimeters;

at least one fastener attached to one side and one fastener attached to either the front or back for attaching the flexible blanket to the outer surface of the vehicle;

a positioning means for temporarily holding the blanket in place on the outer surface of the vehicle while the fastener is being attached; and wherein the bubble-like air pockets are generally circular in cross-section and wherein the average maximum diameter of the circular cross-section of the pockets is less than about 0.75 inches.

5. The protective vehicle cover of claim 4, wherein the inner backing layer and intermediate embossed layers are formed of a thin film polyolefin material and the cover layer is formed of a woven vinyl plastic.

6. The protective vehicle cover of claim 4, wherein the cover layer is a woven vinyl plastic cover layer and wherein the woven vinyl plastic cover layer forms a decorative outer appearance for the blanket when the blanket is attached to the outer surface of the vehicle.

\* \* \* \* \*